US009950627B2

(12) United States Patent
Yaegaki et al.

(10) Patent No.: US 9,950,627 B2
(45) Date of Patent: Apr. 24, 2018

(54) POWER CONVERSION DEVICE

(71) Applicant: Hitachi Automotive Systems, Ltd., Hitachinaka-shi, Ibaraki (JP)

(72) Inventors: Sho Yaegaki, Hitachinaka (JP); Hiroshi Tamura, Tokyo (JP); Takeshi Matsuo, Hitachinaka (JP); Hiroyuki Yamada, Hitachinaka (JP); Nobuhiro Akasaka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/033,132

(22) PCT Filed: Oct. 14, 2014

(86) PCT No.: PCT/JP2014/077282
§ 371 (c)(1),
(2) Date: Apr. 29, 2016

(87) PCT Pub. No.: WO2015/068533
PCT Pub. Date: May 14, 2015

(65) Prior Publication Data
US 2016/0280076 A1  Sep. 29, 2016

(30) Foreign Application Priority Data

Nov. 7, 2013 (JP) .................................. 2013-230777

(51) Int. Cl.
*B60L 11/02* (2006.01)
*B60L 3/00* (2006.01)
(Continued)

(52) U.S. Cl.
CPC ............... *B60L 11/02* (2013.01); *B60L 3/003* (2013.01); *B60L 11/123* (2013.01);
(Continued)

(58) Field of Classification Search
CPC ........ B60L 11/02; B60L 11/1809; B60L 3/00; B60L 9/18; H02M 1/08;
(Continued)

(56) References Cited

U.S. PATENT DOCUMENTS

2006/0114702 A1* 6/2006 Yamada ................... H02M 1/38
363/132
2010/0207598 A1  8/2010 Hamatani
(Continued)

FOREIGN PATENT DOCUMENTS

CN  102421626 A  4/2012
JP  2004-201439 A  7/2004
(Continued)

OTHER PUBLICATIONS

Hirasawa Takahiko, JP 2009254209 A, Oct. 29, 2009, JPO.*
(Continued)

*Primary Examiner* — Adolf Berhane
*Assistant Examiner* — Bart Iliya
(74) *Attorney, Agent, or Firm* — Crowell & Moring LLP

(57) ABSTRACT

An object is to reduce a discharging time required for discharging residual charges of a capacitor. A power conversion device according to the present invention includes: an inverter circuit unit; a step-up circuit unit; a smoothing capacitor; and a step-up circuit control unit which controls the step-up circuit unit, wherein the step-up circuit unit has a first switching element, a second switching element connected electrically in series to the first switching element, and a reactor having a conducting current controlled by switching operation of the first switching element and the second switching element, and the step-up circuit control unit has a first control mode of controlling the switching operation of the first switching element and the second switching element by changing a duty command value and (Continued)

outputting a stepped up voltage from the step-up circuit unit, and a discharge control mode of discharging electric charges stored in the smoothing capacitor into the reactor, with the duty command value fixed to a predetermined value.

6 Claims, 8 Drawing Sheets

(51) Int. Cl.
*H02M 1/08* (2006.01)
*H02M 3/155* (2006.01)
*H02M 3/158* (2006.01)
*H02M 7/48* (2007.01)
*B60L 11/18* (2006.01)
*H02M 7/537* (2006.01)
*B60L 11/12* (2006.01)
*H02M 7/5387* (2007.01)
*H02M 7/5395* (2006.01)
*H02M 1/00* (2006.01)
*H02M 1/32* (2007.01)

(52) U.S. Cl.
CPC ........... *B60L 11/1809* (2013.01); *H02M 1/08* (2013.01); *H02M 3/155* (2013.01); *H02M 3/1588* (2013.01); *H02M 7/48* (2013.01); *H02M 7/537* (2013.01); *B60L 2210/14* (2013.01); *B60L 2240/525* (2013.01); *H02M 7/5387* (2013.01); *H02M 7/5395* (2013.01); *H02M 2001/007* (2013.01); *H02M 2001/0009* (2013.01); *H02M 2001/322* (2013.01); *H02M 2001/327* (2013.01); *Y02T 10/6217* (2013.01); *Y02T 10/7005* (2013.01); *Y02T 10/7022* (2013.01); *Y02T 10/7077* (2013.01); *Y02T 10/7225* (2013.01)

(58) Field of Classification Search
CPC ... H02M 2001/0009; H02M 2001/007; H02M 2001/322; H02M 2001/327; H02M 3/155; H02M 3/1588; H02M 7/48; H02M 7/537; H02M 7/5387; H02M 7/5395; Y02B 70/1466

See application file for complete search history.

(56) References Cited

U.S. PATENT DOCUMENTS

| | | | |
|---|---|---|---|
| 2010/0213904 A1* | 8/2010 | Yamada | B60L 3/003 320/166 |
| 2010/0295494 A1* | 11/2010 | Takeuchi | B60L 3/0023 318/504 |
| 2012/0039100 A1 | 2/2012 | Hirose | |
| 2012/0293138 A1 | 11/2012 | Kanzaki et al. | |
| 2013/0113090 A1* | 5/2013 | Atsumi | H01L 24/33 257/676 |
| 2013/0154556 A1* | 6/2013 | Takahashi | G05F 3/08 320/108 |

FOREIGN PATENT DOCUMENTS

| | | |
|---|---|---|
| JP | 2007-244070 A | 9/2007 |
| JP | 2009-219200 | 9/2009 |
| JP | 2009-254209 | 10/2009 |
| JP | 2009-254209 A | 10/2009 |
| JP | 2010-119175 | 5/2010 |
| JP | 2013-17302 A | 1/2013 |
| WO | WO 2010/131353 A1 | 11/2010 |
| WO | WO 2011/089723 A1 | 7/2011 |

OTHER PUBLICATIONS

International Search Report (PCT/ISA/210) issued in PCT Application No. PCT/JP2014/077282 dated Jan. 20, 2015 with English translation (3 pages).
Japanese-language Written Opinion (PCT/ISA/237) issued in PCT Application No. PCT/JP2014/077282 dated Jan. 20, 2015 (6 pages).
Japanese-language Office Action issued in counterpart Japanese Application No. 2015-546573 dated Aug. 22, 2017 with unverified English translation (nine pages).
Chinese-language Office Action issued in counterpart Chinese Application No. 201480059265.7 dated Aug. 30, 2017 (Seven (7) pages).
Japanese-language Office Action issued in counterpart Japanese Application No. 2015-546573 dated Jan. 9, 2018 with unverified English translation (Fourteen (14) pages).

* cited by examiner

POWER CONVERSION DEVICE

TECHNICAL FIELD

The present invention relates to a power conversion device, and more particularly, an on-vehicle power conversion device which realizes discharge operation of a smoothing capacitor provided for an inverter and a step-up converter.

BACKGROUND ART

As environmentally-friendly vehicles, a hybrid vehicle and an electric vehicle are vehicles using, as a power source, a direct-current power supply, an inverter and a motor driven by the inverter in addition to a conventional engine. Specifically, a power source is obtained by driving an engine, as well as converting a direct-current voltage from a direct-current power supply into an alternating-current voltage by an inverter and rotating a motor by the converted alternating-current voltage. Additionally, an electric vehicle is a vehicle which uses, as a power source, a direct-current power supply, an inverter, and a motor driven by the inverter.

This inverter is provided with a capacitor for smoothing direct-current power from the direct-current power supply. The inverter needs to be provided with a discharging circuit function of discharging charges remaining in the capacitor after the inverter stops. The inverter is also provided with a step-up converter for stepping up a direct-current voltage from the direct-current power supply.

PTL 1 discloses that in a control device 30, residual charges of a capacitor C1 connected between a step-up converter and a direct-current power supply are consumed by step-up operation by the step-up converter and residual charges of a capacitor C2 connected between the step-up converter and an inverter circuit are consumed by step-down operation by the step-up converter.

However, it demanded to further reduce a discharging time required for discharging residual charges of a capacitor.

CITATION LIST

Patent Literature

PTL 1: JP 2004-201439 A

SUMMARY OF INVENTION

Technical Problem

An object of the present invention is to reduce a discharging time required for discharging residual charges of a capacitor.

Another object of the present invention is to further improve reliability when in discharging residual charges of a capacitor by using a reactor of a step-up converter.

Solution to Problem

In order to solve the above issue, a power conversion device according to the present invention includes: an inverter circuit unit which converts a direct current into an alternating current; a step-up circuit unit which steps up a voltage to be applied to the inverter circuit unit; a smoothing capacitor connected electrically in parallel to the inverter circuit unit and the step-up circuit unit; and a step-up circuit control unit which controls the step-up circuit unit, wherein the step-up circuit unit has a first switching element, a second switching element connected electrically in series to the first switching element, and a reactor having a conducting current controlled by switching operation of the first switching element and the second switching element, and the step-up circuit control unit has a first control mode of controlling the switching operation of the first switching element and the second switching element by changing a duty command value and outputting a stepped up voltage from the step-up circuit unit, and a discharge control mode of discharging electric charges stored in the smoothing capacitor into the reactor, with the duty command value fixed to a predetermined value.

Advantageous Effects of Invention

The present invention enables reduction in a discharging time required for discharging residual charges of a capacitor.

DESCRIPTION OF EMBODIMENTS

In the following, an embodiment or the present invention will be described with reference to the drawings.

Embodiment 1

Figure 1:
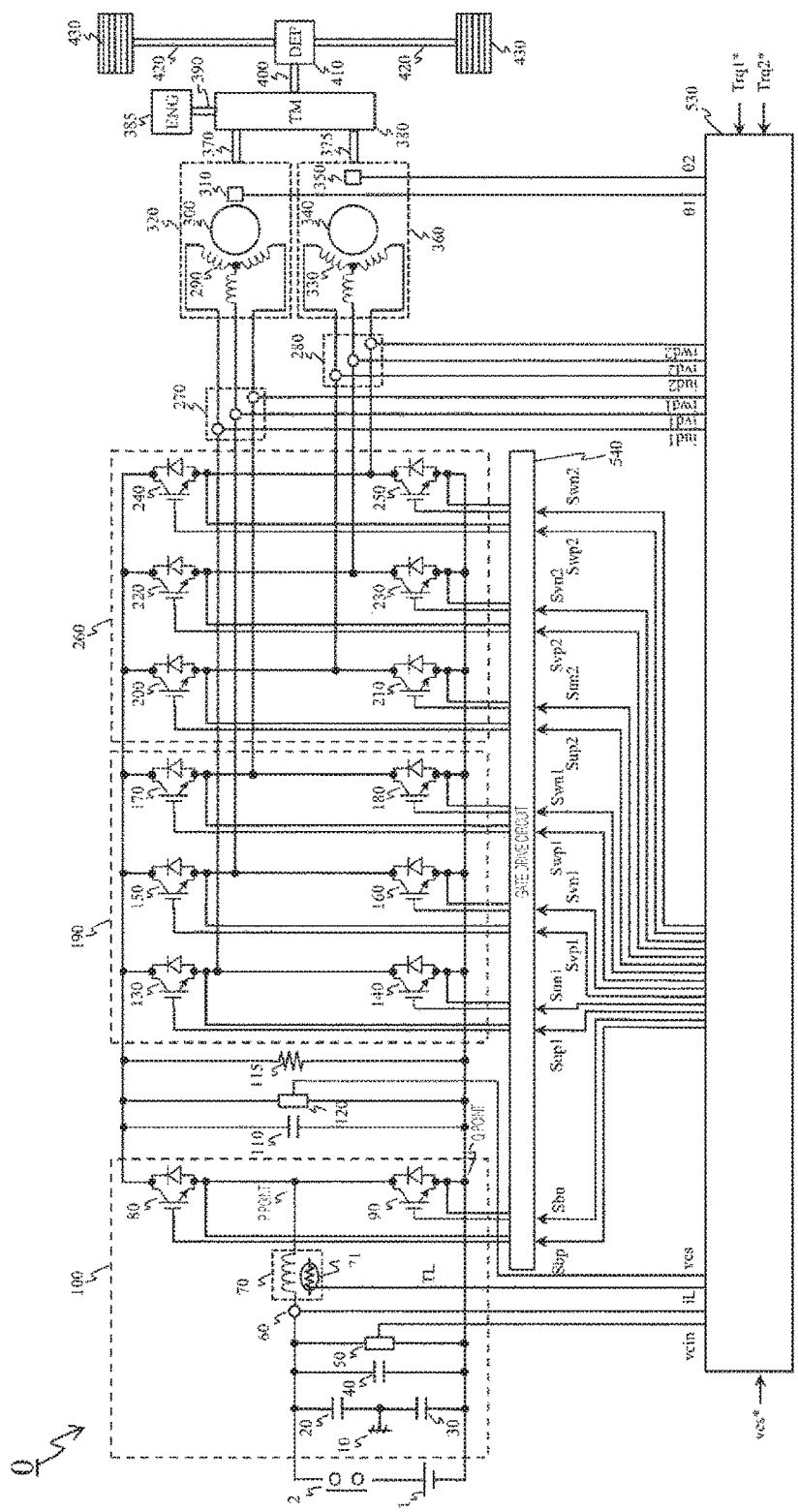
FIG. 1 is a diagram for explaining a configuration of a power conversion system according to a first embodiment of the present invention.

FIG. 1 is a diagram for explaining a power conversion system according to a first embodiment of the present invention.

A power conversion system 0 has a battery 1, a system relay 2, a step-up converter 100, an inverter 190, an inverter 260, a smoothing capacitor 110, a discharge resistance 115, a voltage sensor 120, a current sensor 270 and a current sensor 280, a control device 530 which controls switching of a switching element 80 and a switching element 90 of the step-up converter 100, switching elements 130, 140, 150, 160, 170 and 180 of the inverter 190, switching elements 200, 210, 220, 230, 240 and 250 of the inverter 260, and a gate drive circuit 540 which generates gate voltages of the switching elements 80 and 90 of the step-up converter 100, the switching elements 130, 140, 150, 160, 170, 180 of the inverter 190, and the switching elements 200, 210, 220, 230, 240, 250 of the inverter 260.

For the battery 1, a nickel hydride battery or a lithium ion battery is used. The system relay 2 is arranged between the battery 1 and the step-up converter 100, and when the system relay 2 is off (cut off state), the battery 1 and the step-up converter 100 are electrically cut off and when the system relay 2 is on (conductive state), the battery 1 and the step-up converter 100 are electrically connected to supply power of the battery 2 to the step-up converter 100.

The step-up converter 100 has its primary side connected to the battery 1 and its secondary side connected to the smoothing capacitor 110. Additionally, the step-up converter 100 changes a ratio of on to off of the switching element 80 of an upper arm and the switching element 90 of a lower arm of the step-up converter 100 according to an output voltage command vcs* of the step-up converter 100 received from a vehicle control device (not shown) to control voltage values at both ends of the smoothing capacitor 110 to be not less than a voltage value of the battery 1.

Thus, by increasing input voltages of the inverter 190 and the inverter 260 to be high voltages by using the step-up converter 100, outputs of a motor generator 320 and a motor generator 360 can be increased.

The smoothing capacitor 110 smooths an output of the step-up converter 100 and inputs of the inverter 190 and the inverter 260. The discharge resistance 115 is connected between the voltage sensor 120, and the inverter 190 and the inverter 260.

The voltage sensor 120 is connected in parallel to the smoothing capacitor 110 to detect voltage values at both ends of the smoothing capacitor 110. The voltage sensor 120 is configured by combining a voltage-dividing resistance and a non-inverting amplification circuit using an operational amplifier, or the like.

The inverter 190 has its direct current side connected to the smoothing capacitor 110 and its three-phase alternating current side connected to a three-phase coil 290 wound around a stator of the motor generator 320. Then, according to a torque command Trq1* of the motor generator 320 received from the vehicle control device (not shown), the inverter 190 converts a direct-current voltage of the smoothing capacitor 110 to a three-phase alternating current voltage, which is a variable voltage of a variable frequency. The inverter 190 further applies the converted three-phase alternating current voltage to the three-phase coil 290 of the motor generator 320 to control the three-phase alternating current flowing through the three-phase coil 290 of the motor generator 320.

The inverter 260 has its direct current side connected to the smoothing capacitor 110 and its three-phase alternating current side connected to a three-phase coil 330 wound around a stator of the motor generator 360. Then, according to a torque command Trq2* of the motor generator 360 received from the vehicle control device (not shown), the inverter 260, similarly to the inverter 190, converts a direct-current voltage of the smoothing capacitor 110 to a three-phase alternating current voltage, which is a variable voltage of a variable frequency. The inverter 260 further applies the converted three-phase alternating current voltage to the three-phase coil 330 of the motor generator 360 to control the three-phase alternating current flowing through the three-phase coil 330 of the motor generator 360.

The motor generator 320 generates a rotation magnetic field by a three-phase alternating current flowing through the three-phase coil 290 wound around the stator and accelerates or decelerates a rotor 300 by the generated rotation magnetic field to generate a torque of the motor generator 320. The generated torque of the motor generator 320 is transmitted to a transmission 380 via a motor generator shaft 370.

The motor generator 360, similarly to the motor generator 320, generates a rotation magnetic field by a three-phase alternating current flowing through the three-phase coil 330 wound around the stator and accelerates or decelerates a rotor 340 by the generated rotation magnetic field to generate a torque of the motor generator 360. The generated torque of the motor generator 360 is transmitted to the transmission 380 via a motor generator shaft 375.

Although the motor generator 320 and the motor generator 360 are desirably small-sized, highly efficient and high output permanent magnet motors, they can be induction motors.

An engine 385 controls intake, compression, combustion and exhaust of fuel according to a torque command of the engine 385 received from the vehicle control device (not shown) to generate a torque of the engine 385. The generated torque of the engine 385 is transmitted to the transmission 380 via a crank shaft 390.

The transmission 380 transmits a torque as the addition of the transmitted torques of the motor generators 320 and 360 and the transmitted torque of the engine 385 to a differential gear 410 via a propeller shaft 400. The differential gear 410 converts the torque transmitted from the transmission 380 into a drive shaft torque and transmits the obtained torque to a drive shaft 420.

The drive shaft 420 accelerates or decelerates a vehicle (not shown) by accelerating or decelerating rotation of a drive shaft 430 of the vehicle by the transmitted drive shaft torque. The motor generator 320 is capable of converting the torque of the engine 385 transmitted to the motor generator shaft 370 via the transmission 380 into power and charging the battery 1 with the converted power via the inverter 190 and the step-up converter 100, or alternatively supplying the power to the motor generator 360 via the inverter 190 and the inverter 260. Further, the motor generator 320 is also capable of converting the rotation energy of the drive shaft 430 transmitted to the motor generator shaft 370 sequentially via the drive shaft 420, the differential gear 410, the propeller shaft 400 and the transmission 380 into power and charging the battery 1 with the converted power via the inverter 190 and the step-up converter 100.

The motor generator 360, similarly to the motor generator 320, is capable of converting the torque of the engine 385 transmitted to the motor generator shaft 375 via the transmission 380 into power and charging the battery 1 with the converted power via the inverter 260 and the step-up converter 100, or alternatively supplying the power to the motor generator 320 via the inverter 260 and the inverter 190.

Further, the motor generator 360 is also capable of converting the rotation energy of the drive shaft 430 transmitted to the motor generator shaft 375 sequentially via the drive shaft 420, the differential gear 410, the propeller shaft 100 and the transmission 380 into power and charging the battery 1 with the converted power via the inverter 260 and the step-up converter 100.

Here, a mode in which power is supplied from the battery 1 to the motor generators 320 and 360 via the step-up converter 100 and the inverters 190 and 260 is defined as a power running mode and a mode in which power generated by the motor generators 320 and 360 is charged in the battery 1 via the inverters 190 and 260 and the step-up converter inn defined as a regenerative mode. For reducing fuel consumption, a hybrid vehicle makes the most of the power running mode at the time of starting or accelerating the vehicle and makes the most of the regenerative mode at the time of decelerating the vehicle.

The step-up converter 100 has a Y capacitor 20 and a Y capacitor 2030, a chassis ground 10, a filter capacitor 40, a voltage sensor 50, a current sensor 60, a reactor 70, the switching element 80 of the upper arm which is configured with an IGBT and diode, and the switching element 90 of the lower arm which is configured with an IGBT and a diode. The Y capacitor 20 has its high potential side connected to a high potential side of the battery 1, a high potential side of the filter capacitor 40, one end of the voltage sensor 50, and one end of the reactor 70 via the current sensor 60, and has its low potential side connected to the chassis ground 10 and a high potential side of a Y capacitor 30.

The Y capacitor 30 has its low potential side connected to a low potential side of the battery 1, a low potential side of the filter capacitor 40, the other end of the voltage sensor 50, and an emitter side of the IGBT and an anode side of the diode configuring the switching element 90 of the lower arm of the step-up converter 100.

The filter capacitor 40 smooths the output of the battery 1 and has the same voltage as that of the battery 1 when the system relay 2 is closed. The reactor 70 has a thermistor 71 for measuring a coil temperature of the reactor 70. In other words, the thermistor 71 functions as a temperature detection circuit unit.

A collector side of the IGBT and a cathode side of the diode configuring the switching element 90 of the lower arm of the step-up converter 100 are connected to an emitter side of the IGBT and an anode side of the diode configuring the switching element 80 of the upper arm of the step-up converter 100, and a middle point connecting them and the other end of the reactor 70 are connected.

A collector side of the IGBT and a cathode side of the diode configuring the switching element 80 of the upper arm of the step-up converter 100 are connected to a high potential side of the smoothing capacitor 110.

The emitter side of the IGBT and the anode side of the diode configuring the switching element of 90 of the lower arm of the step-up converter 100 are connected to a low potential side of the smoothing capacitor 110.

The inverter 190 has the switching element 130 of the upper arm and the switching element 140 of the lower arm which are of a U-phase, the switching element 150 of the upper arm and the switching element 160 of the lower arm which are of a V-phase, and the switching element 170 of the upper arm and the switching element 180 of the lower arm which are of a U-phase.

An emitter side of the IGBT and an anode side of the diode configuring the U-phase switching element 130 of the upper arm of the inverter 190 are connected to a collector side of the IGBT and a cathode side of the diode configuring the U-phase switching element 140 of the lower arm of the inverter 190, and a middle point connecting them is connected to a U-phase coil of the three-phase coil 290 of the motor generator 320 via the current sensor 270.

An emitter side of the IGBT and an anode side of the diode configuring the V-phase switching element 150 of the upper arm of the inverter 190 are connected to a collector side of the IGBT and a cathode side of the diode configuring the V-phase switching element 160 of the lower arm of the inverter 190, and a middle point connecting them is connected to a V-phase coil of the three-phase coil 290 of the motor generator 320 via the current sensor 270.

An emitter side of the IGBT and an anode side of the diode configuring the W-phase switching element 170 of the upper arm of the inverter 190 are connected to a collector side of the IGBT and cathode side of the diode configuring the W-phase switching element 180 of the lower arm of the inverter 190, and a middle point connecting them is connected to a W-phase coil of the three-phase coil 290 of the motor generator 320 via the current sensor 270.

A collector side of the IGBT and a cathode side of the diode of each of the UVW phase switching elements 130, 150 and 170 of the upper arm of the inverter 190 are connected to the high potential side of the smoothing capacitor 110, and an emitter side of the IGBT and an anode side of the diode configuring the UVW phase switching elements 140, 160 and 180 of the lower arm of the inverter 190 are connected to the low potential side of the smoothing capacitor 110.

The inverter 260 has the U-phase switching elements 200 and 210 of the upper and lower arms of the inverter 260, the V-phase switching elements 220 and 230 of the upper and lower arms of the inverter 260, and the W-phase switching elements 240 and 250 of the upper and lower arms of the inverter 260.

An emitter side of the IGBT and an anode side of the diode configuring the U-phase switching element 200 of the upper arm of the inverter 260 are connected to a collector side of the IGBT and a cathode side of the diode configuring the U-phase switching element 210 of the lower arm of the inverter 260, and a middle point connecting them is connected to a U-phase coil of the three-phase coil 330 of the motor generator 360 via the current sensor 280.

An emitter side of the IGBT and an anode side of the diode configuring the V-phase switching element 220 of the upper arm of the inverter 260 are connected to a collector side of the IGBT and a cathode side of the diode configuring the V-phase switching element 230 of the lower arm of the inverter 260, and a middle point connecting them is connected to a V-phase coil of the three-phase coil 330 of the motor generator 360 via the current sensor 280.

An emitter side of the IGBT and an anode side of the diode configuring the W-phase switching element 240 of the upper arm of the inverter 260 are connected to a collector side of the IGBT and a cathode of the diode configuring the W-phase switching element 250 of the lower arm of the inverter 260, and a middle point connecting them is connected to a W-phase coil of the three-phase coil 330 of the motor generator 360 via the current sensor 280. The switching elements 80 and 90 of the step-up converter 100, the switching elements 130, 140, 150, 160, 170, 180 of the inverter 190, and the switching elements 200, 210, 220, 230, 240, 250 of the inverter 260 may be each configured with a MOSFET or the like.

The control device 530 controls switching of the switching elements 80 and 90 of the step-up converter 100 based on the output voltage command vcs* of the step-up converter 100 received from the vehicle control device (not shown), a current value it flowing through the reactor 70 detected by the current sensor 60, a voltage value vcin at both ends of the filter capacitor 40 detected by the voltage sensor 50, and voltage values vcs at both ends of the smoothing capacitor 110 detected by the voltage sensor 120.

Further, the control device 530 controls switching of the switching elements 130, 140, 150, 160, 170, 180 of the inverter 190 and the switching elements 200, 210, 220, 230, 240, 250 of the inverter 260 based on the torque command Trq1* of the motor generator 320 received from the vehicle control device (not shown) and a magnetic pole position θ1 of the rotor 300 of the motor generator 320 detected by an angle detector 310.

The gate drive circuit 540 generates a voltage which enables turning-on or turning-off of the IGBT configuring each of the switching elements 130, 140, 150, 160, 170, 180 of the inverter 190 based on switching signals Sup1, Sun1, Svp1, Svn1, Swp1 and Swn1 for the switching elements 130, 140, 150, 160, 170, 180 of the inverter 190 which are generated by a switching signal generation unit 460 (see FIG. 2) provided in the control device 530 and applies the generated voltage to between a gate and the emitter of the IGBT configuring each of the switching elements 130, 140, 150, 160, 170, 180 of the inverter 190.

Further, the gate drive circuit 540 generates a voltage which enables turning-on or turning-off of the IGBT configuring each of the switching elements 200, 210, 220, 230, 240, 250 of the inverter 260 based on switching signals Sup2, Sun2, Svp2, Svn2, Swp2 and Swn2 for the switching elements 200, 210, 220, 230, 240, 250 of the inverter 260 which are generated by the switching signal generation unit 460 (see FIG. 2) provided in the control device 530, and applies the generated voltage to between a gate and an emitter of the IGBT configuring each of the switching elements 200, 210, 220, 230, 240, 250 of the inverter 260.

Further, the gate drive circuit 540 generates a voltage which enables turning-on or turning-off of the IGBT configuring each of the switching elements 80 and 90 of the step-up converter 100 based on switching signals Sbp and Sbn for the switching elements 80 and 90 of the step-up converter 100 which are generated by the switching signal generation unit 460 provided in the control device 530, and applies the generated voltage to between gate of the switching elements 80 and 90 and the emitter.

Figure 2:
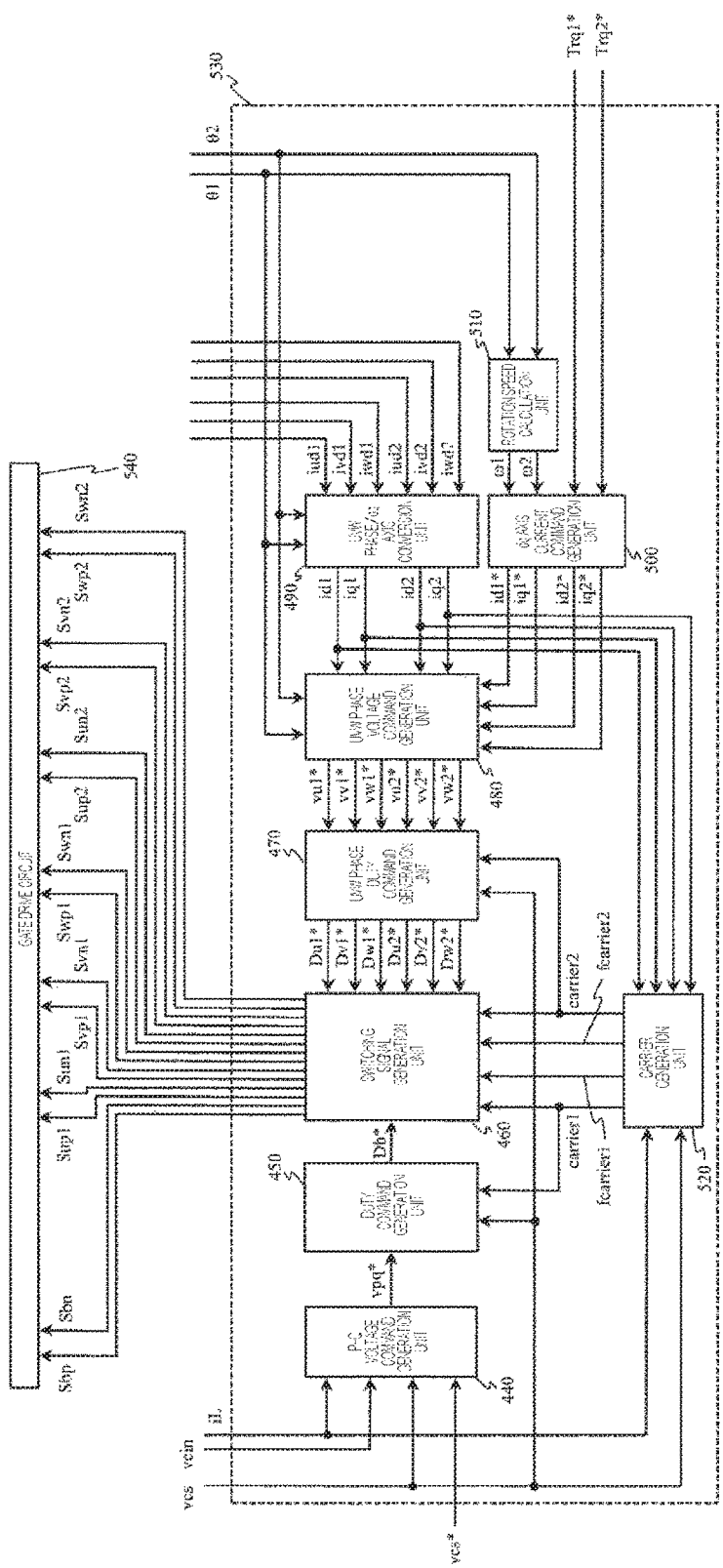
FIG. 2 is a diagram for explaining a configuration of a control device 530 according to the first embodiment of the present invention.

FIG. 2 is a diagram for explaining a configuration of the control device 530 illustrated in FIG. 1.

The control device 530 has a UVW phase/dq-axis conversion unit 490, a rotation speed calculation unit 510, a dg-axis current command generation unit 500, a UVW phase voltage command generation unit 480 for the inverter 190 and the inverter 260, a P-Q voltage command generation unit 440 for the step-up converter 100, a carrier generation unit 520, a UVW phase duty command generation unit 470 for the inverters 190 and 260, a duty command generation unit 450 for the step-up converter 100, and the switching signal generation unit 460.

The UVW phase/dq-axis conversion unit 490 calculates dg-axis current values id1 and iq1 of the motor generator 320 based on UVW phase current values iud1, ivd1, iwd1 flowing through the three-phase coil 290 of the motor generator 320 which are detected by current sensor 270, and the magnetic pole position 91 of the rotor 300 of the motor generator 320 which is detected by the angle detector 310, as well as calculating dq-axis current values id2 and ig2 of the motor generator 360 based on UVW phase current values iud2, ivd2, iwd2 flowing through the three-phase coil 330 of the motor generator 360 which are detected by the current sensor 280, and a magnetic pole position 92 of the rotor 340 of the motor generator 360 which is detected by the angle detector 310. The calculated dq-axis current values id1, iq1 of motor generator 320 and the calculated dq-axis current values id2, ig2 of the motor generator 360 are input to the UVW phase voltage command generation unit 480 for the inverters 190 and 260 and to the carrier generation unit 520. For angle detectors 310, 350, a resolver or an encoder is used.

The rotation speed calculation unit 510 calculates a rotation speed ω1 of the rotor 300 of the motor generator 320 based on the magnetic pole position θ1 of the rotor 300 of the motor generator 320 detected by the angle detector 310, as well as calculating a rotation speed ω2 of the rotor 340 of the motor generator 360 based on the magnetic pole position θ2 of the rotor 340 of the motor generator 360 detected by the angle detector 350. The rotation speed ω1 and the rotation speed ω2 are input to the dq-axis current command generation unit 500.

The dq-axis current command generation unit 500 generates dq-axis current command values id1*, iq1* of the motor generator 320 based on the torque command Trq1* of the motor generator 320 received from the vehicle control device (not shown) and the rotation speed ω1 calculated by the rotation speed calculation unit 510, as well as generating dq-axis current command values id2*, iq2* of the motor generator 360 based on a torque command Trq2* of the motor generator 360 received from the vehicle control device (not shown) and the rotation speed ω2 calculated by the rotation speed calculation unit 510. The generated dq-axis current command values id1*, iq1* and dq-axis current command values id2*, iq2* are input to the UVW phase voltage command generation unit 480 for the inverters 190 and 260.

The UVW phase voltage command generation unit 480 for the inverters 190 and 260 generates UVW phase voltage command values vu1*, vv1*, vw1* of the inverter 190 such that the dq-axis current values id1, iq1 of the motor generator 320 coincide with the dq-axis current command values id1*, iq1* of the motor generator 320 based on the magnetic pole position θ1 of the rotor 300, the dq-axis current values id1, iq1 calculated by the UVW phase/dq-axis conversion unit 490 and the dq-axis current command values id1*, iq1* generated by the dq-axis current command generation unit 500.

Further, the UVW phase voltage command generation unit 480 for the inverters 190 and 260 generates UVW phase voltage command values vu2*, vv2*, vw2* of the inverter 260 such that the dq-axis current values id2, ig2 of the motor generator 360 coincide with the dq-axis current values id2*, iq2* of the motor generator 360 based on the magnetic pole position θ2 of the rotor 340, the dq-axis current values id2, calculated by the UVW phase/dg-axis conversion unit 490 and the dq-axis current command values id2*, iq2 generated by the dq-axis current command generation unit 500.

The generated UVW phase voltage command values vu1*, vw1*, vv1*, of the inverter 190 and UVW phase voltage command values vu2*, vv2*, vw2* of the inverter 260 are input to the UVW phase duty command generation unit 470 for the inverters 190 and 260.

The P-Q voltage command generation unit 440 of the step-up converter 100 generates a command value vpg* (hereinafter, referred to as a P-Q voltage command value vpg*) of a voltage to be applied to between a P point (see FIG. 1) which connects the other end of the reactor 70 and the switching elements 80 and 90 of the upper and lower arms of the step-up converter 100 and a Q point (see FIG. 1) to which the low potential side of the battery 1, and the emitter side of the IGFT and the anode side of the diode configuring the switching element 90 of the lower arm of the step-up converter 100 are connected such that the voltage values vcs at both ends of the smoothing capacitor 110 coincide with the output voltage command vcs* of the step-up converter 100 based on the output voltage command vcs* of the step-up converter 100 received from the vehicle control device (not shown), the current value it flowing through the reactor 70 which is detected by the current sensor 60, the voltage values vcin at both ends of the filter capacitor 40 which are detected by the voltage sensor 50, and the voltage values vcs at both ends of the smoothing capacitor 110 which are detected by the voltage sensor 120. The generated P-Q voltage command value vpq* is input to the duty command generation unit 450 of the step-up converter 100.

The carrier generation unit 520 generates a carrier frequency fcarrier1 for the step-up converter 100, a triangular wave carrier carrier1 for the step-up converter 100, a carrier frequency fcarrier2 for the inverters 190 and 260, and a triangular wave carrier carrier2 for the inverters 190 and 260 based on the voltage values vcs at both ends of the smoothing capacitor 110, the current value it flowing through the reactor 70, the dq-axis current values id1, iq1 of the motor generator 320 calculated by the UVW phase/dq-axis conversion unit 490, and the dq-axis current values id2, iq2 of the motor generator 360.

The triangular wave carrier carrier1 is input to the duty command generation unit 450 and the switching signal generation unit 460 for the step-up converter 100. Additionally, the generated triangular wave carrier carrier2 for the inverters 190 and 260 is input to the UVW phase duty command generation unit 470 and the switching signal generation unit 460 for the inverters 190 and 260, and the generated carrier frequency fcarrier1 for the step-up converter 100 and the carrier frequency fcarrier2 for the inverters 190 and 260 are input to the switching signal generation unit 460.

The UVW phase duty command generation unit 470 generates UVW phase duty command values Du1*, Dv1*, Dw1* of the inverter 190 based on the UVW phase voltage command values vu1*, vv1*, vw1*, the voltage values vcs at both ends of the smoothing capacitor 110, and the triangular wave carrier carrier2. Further, the UVW phase duty command generation unit 470 generates UVW phase duty command values Du2*, Dv2*, Dw2* of the inverter 260 based on the UVW phase voltage command values vu2*, vv2*, vw2*, the voltage values vcs at both ends of the smoothing capacitor 110, and the triangular wave carrier carrier2. The generated UVW phase duty command values Du1*, Dv1*, Dw1* of the inverter 190 and UVW phase duty command values Du2*, Dv2*, Dw2* of the inverter 260 are input to the switching signal generation unit 460. The duty command generation unit 450 of the step-up converter 100 generates a duty command value Db* of the step-up converter 100 based on the voltage values vcs at both ends of the smoothing capacitor 110, the P-Q voltage command value vpq* and the triangular wave carrier carrier1. The generated duty command value Db* of the step-up converter 100 is input to the switching signal generation unit 460. The switching signal generation unit 460 generates the switching signal Svp1 for the U-phase switching element 130 of the upper arm, the switching signal Sun1 for the U-phase switching element 140 of the lower arm, the switching signal Svp1 for the V-phase switching element 150 of the upper arm, the switching signal Svn1 for the switching element 160 of the lower arm, the switching signal Swp1 for the U-phase switching element 170 of the upper arm, and the switching signal Swn1 for the W-phase switching element 180 of the lower arm based on the UVW phase duty command values Du1*, Dv1*, Dw1*, the triangular wave carrier carrier2 for the inverters 190 and 260, the carrier frequency fcarrier2 for the inverters 190 and 260, and the carrier frequency fcarrier1 for the step-up converter 100.

Further, the switching signal generation unit 460 generates the switching signal Sup2 for the U-phase switching element 200 of the upper arm, the switching signal Sun2 for the U-phase switching element 210 of the lower arm, the switching signal Svp2 for the V-phase switching element 220 of the upper arm, the switching signal Svn2 for the V-phase switching element 230 of the lower arm, the switching signal Swp2 for the W-phase switching element 240 of the upper arm, and the switching signal Swn2 for the W-phase switching element 250 of the lower arm based on the UVW phase duty command values Du2*, Dv2*, Dw2*, the triangular wave carrier carrier2 for the inverters 190 and 260, the carrier frequency fcarrier2 for the inverters 190 and 260, and the carrier frequency fcarrier1 for the step-up converter 100.

Further, the switching signal generation unit 460 generates the switching signal Sbp for the switching element 80 of the upper arm of the step-up converter 100, and the switching signal Sbn for the switching element 90 of the lower arm of the step-up converter 100 based on the duty command value Db* of the step-up converter 100 generated by the duty command generation unit 450 for the step-up converter 100, the triangular wave carrier carrier1 for the step-up converter 100, the carrier frequency fcarrier1 for the step-up converter 100, and the carrier frequency fcarrier2 for the inverters 190 and 260.

The generated switching signals Sup1, Sun1, Svp1 Svn1, Swp1, Swn1 for the switching elements 130, 140, 150, 160, 170, 180 of the inverter 190, switching signals Sup2, Sun2, Svp2, Svn2, Swp2, Swn2 for the switching elements 200, 210, 220, 230, 240, 250 of the inverter 260 and switching signals Sbp and Sbn for the switching elements 80 and 90 of the step-up converter 100 are input to the gate drive circuit 540.

Figure 3:
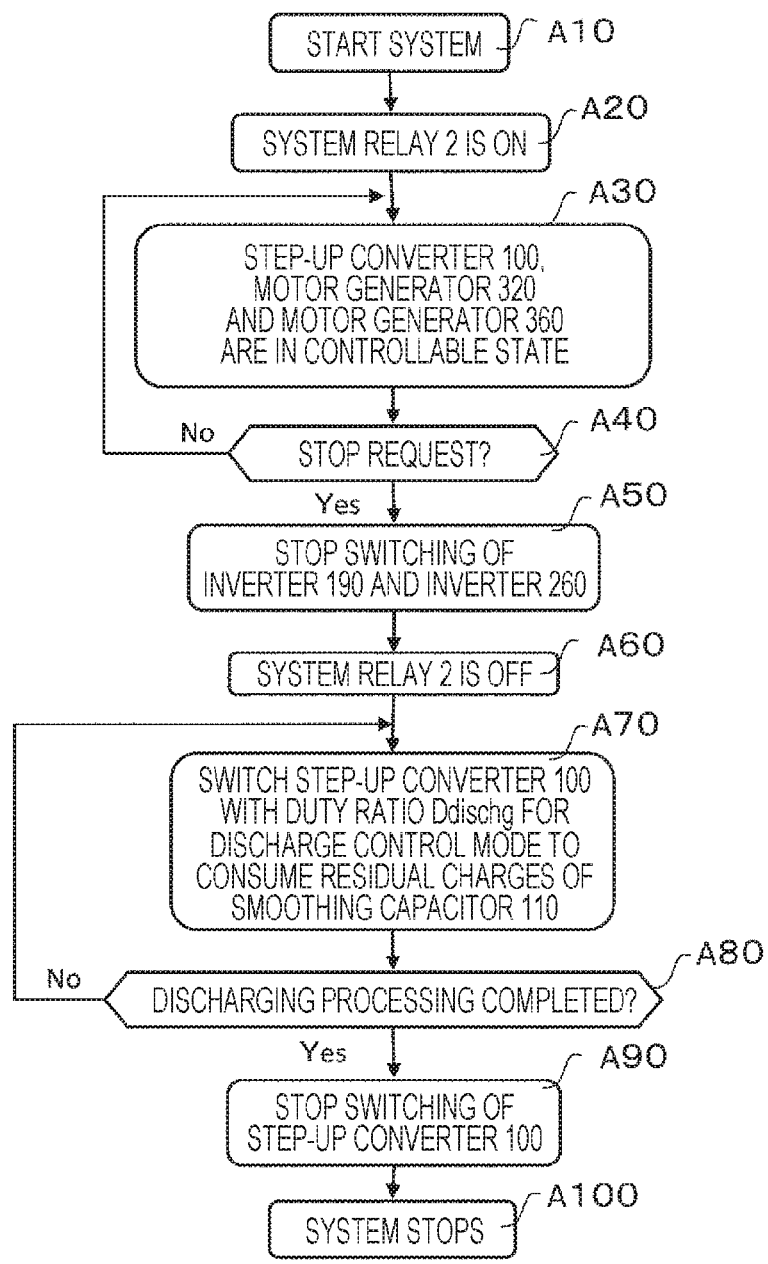
FIG. 3 is a flow chart for explaining a flow from start to stop of the control device 530 according to the first embodiment of the present invention.

Thus configuring the power conversion system enables such control as to make the torque of the motor generator 320 coincide with the torque command Trq1* of the motor generator 320 received from the vehicle, control device (not shown). It is further possible to control the torque of the motor generator 360 to coincide with the torque command Trq2* of the motor generator 360. It is further possible to control the output voltage vcs (voltage values vcs at both ends of the smoothing capacitor 110) of the step-up converter 100 to coincide with the output voltage command vcs* of the step-up converter 100. FIG. 3 is a flow chart for explaining a flow from start to stop of the control device 530.

At Step A10, the control device 530 starts to transit to Step A20.

At Step A20, the system relay 2 is closed. As a result, the battery 1 and the step-up converter 100 are connected to apply a voltage to the filter capacitor 40. At this time, since the switching element 80 of the upper arm of the step-up converter 100 is set to be on and the switching element 90 of the lower arm is set to be off, the voltage of the battery 1 is applied also to the smoothing capacitor 110. When the determination is made that the voltages of the filter capacitor 40 and the smoothing capacitor 110 become generally the same as the voltage of the battery 1, and preparation for controlling the motor generator 320 and the motor generator 360 is completed, the step transits to Step A30.

At Step A30, the step-up operation of the step-up converter 100 and the drive control of the motor generator 320 and the motor generator 360 are performed at the control device 530 to transit to Step A40.

At Step A40, determination is made whether a stop request is received from the system or not. When a stop request to the control device 530 such as an ignition off signal of an external ECU is confirmed, the step transits to Step A50. Without a stop request to the control device 530, the step again transits to Step A30 to continue the control of the step-up converter 100, the motor generator 320 and the motor generator 360.

At Step A50, switching of the inverter 190 and the inverter 260 is stopped.

At Step A60, the system relay 2 closed to electrically cut off the battery 1 and the step-up converter 100, so that the step transits to Step A60.

At Step A70, discharging processing is performed of discharging electric charges remaining in the filter capacitor 40 and the smoothing capacitor 110 to transit to Step A70. The discharging processing is realized by switching operation of the step-up converter 100. A discharge control mode is selected in the duty ratio command generation unit 450 for the step-up converter 100 to select and output a duty ratio Ddischg* set in advance. The switching operation is performed based on the output duty ratio Ddischg* to consume the residual charges of the smoothing capacitor 110.

At Step A80, determination is made whether the discharging processing is completed or not. When the voltages of the filter capacitor 40 and the smoothing capacitor 110 fall below a predetermined value due to the discharging processing, completion of the discharging processing is confirmed to transit to Step A80. When the voltages of the filter capacitor 40 and the smoothing capacitor 110 fail to exceed the predetermined value, the step again transits to Step A60 to continue the discharging processing.

At Step A90, the switching of the step-up converter 100 is stopped to transit to Step A90. At Step A100, the control device 530 stops.

Figure 4:
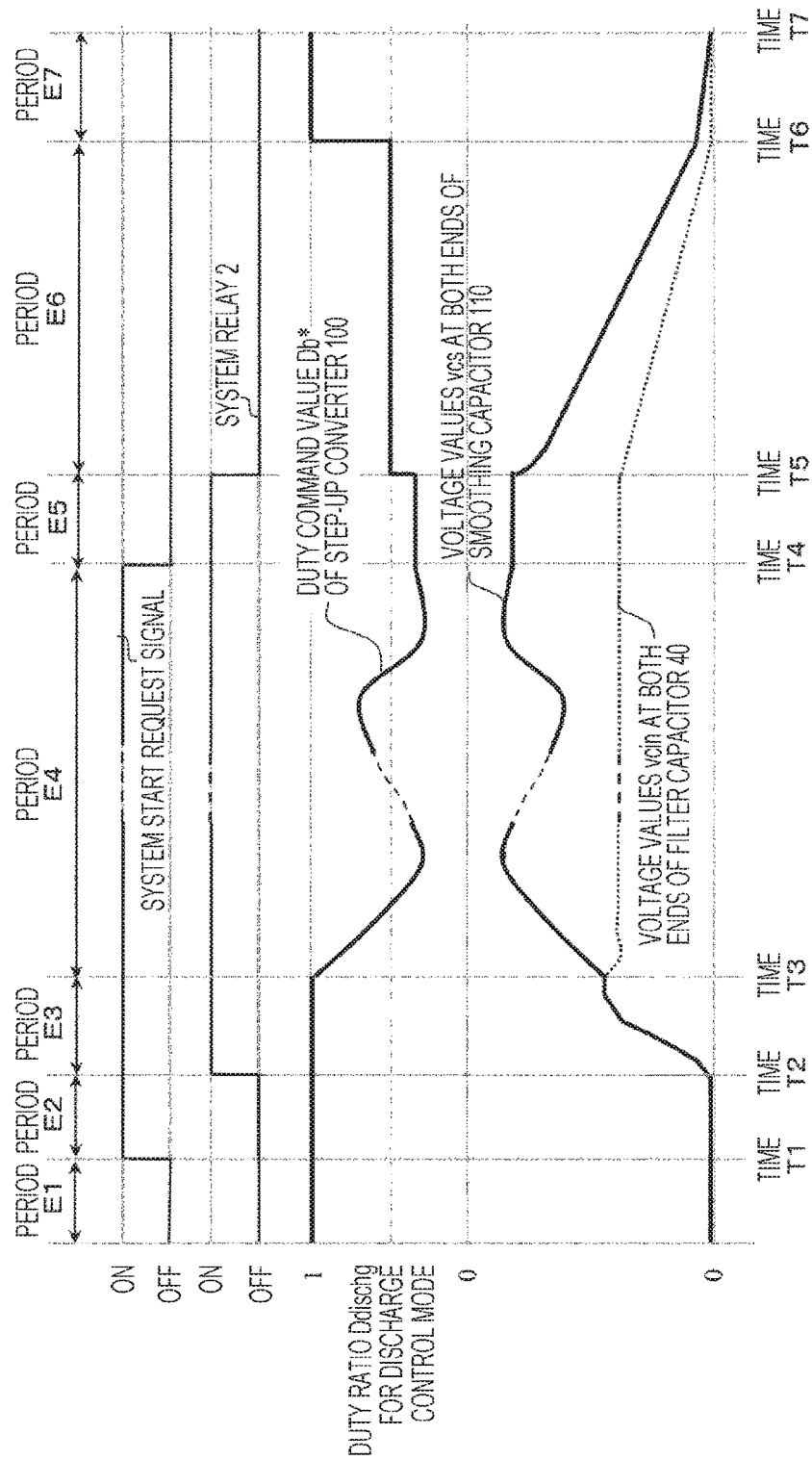
FIG. 4 illustrates a waveform varying with time when processing from start to stop of the control device 530 according to the first embodiment of the present invention is executed.

FIG. 4 illustrates a waveform, varying with time, of an on/off signal of the system relay 2, the duty command value Db* of the step-up converter 100, the voltage values vcs at both ends of the smoothing capacitor 110 and the voltage values vcin at both ends of the filter capacitor 40 when processing from start to stop of the control device 530 illustrated in FIG. 3 is executed.

In a period E1, the control device 530 executes the processing of Step A10 in the flow chart illustrated in FIG. 3, so that the device is in a system start request waiting state. At this time, a system start request signal is off. Additionally, at this time, the system relay 2 is off and the battery 1 and the step-up converter 100 are electrically cut off. Additionally, at this time, since the inverter 190 and the inverter 260 stop switching, the step-up converter, the inverter 190 and the inverter 260 are electrically cut off.

Additionally, in the period E1, since the duty command value Db* of the step-up converter 100 is set to 1, the switching element 80 of the upper arm of the step-up converter 100 is set to be on and the switching element 90 of the lower arm is set to be off, and the step-up converter 100, the inverter 190 and the inverter 260 are being electrically connected.

Additionally, in the period E1, the voltage values vcin at both ends of the filter capacitor 40 are 0 because the battery 1 and the step-up converter 100 are electrically cut off. At this time, the voltage values vcs at both ends of the smoothing capacitor 110 are 0 because the battery 1 and the step-up converter 100 are electrically cut off.

At time T1, the control device 530 receives the system start request signal, for example, an ignition on signal, from the external ECU to transit to the processing of Step A20 in the flow chart illustrated in FIG. 3.

In a period P2, the control device 530 is performing Step A20 of the flow chart illustrated in FIG. 3 to send an on signal to the system relay 2. At this time, the system start request signal is on. Additionally, at this time, the system relay 2 is off, and the battery 1 and the step-up converter 100 are being electrically cut off. Additionally, at this time, since the inverter 190 and the inverter 260 stop switching, the step-up converter, the inverter 190 and the inverter 260 are electrically cut off.

Additionally, in the period P2, the duty command value Db of the step-up converter 100 is set to 0 and remains unchanged from the state in the period E1. At this time, the voltage values vcin at both ends of the filter capacitor 40 are 0 and remain unchanged from the state in the period E1. At this time, the voltage values vcs at both ends of the smoothing capacitor 110 are 0 and remain unchanged from the state in the period E1.

At time T2, the system relay 2 receives the on signal to be turned on.

In a period E3, the control device 530 is performing Step A20 of the flow chart illustrated in FIG. 3. At this time, the system start request signal is one Additionally, at this time, the system relay 2 is on, and the battery 1 and the step-up converter 100 are being electrically connected. Additionally, at this time, the inverter 190 and the inverter 260 stop switching, so that the step-up converter, the inverter 190 and the inverter 260 are electrically cut off.

Additionally, in the period E3, the duty command value Db* of the step-up converter 100 remains unchanged from the state in the period E2. At this time, since the battery 1 and the step-up converter 100 are electrically connected, as the voltage values vein at both ends of the filter capacitor 40, the voltage of the battery 1 is applied. As a result, charges are stored in the filter capacitor 40 to increase the voltage value vcin from 0.

Additionally, in the period E3, because the battery 1, the step-up converter 100, the inverter 190 and the inverter 260 are electrically connected, as the voltage values vcs at both ends of the smoothing capacitor 110, the voltage of the battery 1 is applied. As a result, charges are stored in the smoothing capacitor 110 to increase the voltage value vcs from 0.

At time T3, the voltage values vcs at both ends of the smoothing capacitor 110 and the voltage values vcin at both ends of the filter capacitor 40 become generally equal to the voltage of the battery 1, so that the control device 530 determines that preparation for controlling the motor generator 320 and the motor generator 360 is completed to transit to Step A30.

In a period E4, the control device 530 is repeatedly performing Steps A30 and A40 in the flow chart illustrated in FIG. 3, in which at Step A30, the step-up converter 100, the motor generator 320 and the motor generator 360 perform control and at Step A40, the device monitors presence/non-presence of a system stop request. At this time, the system start request signal is on. Additionally, at this time, the system relay 2 is on and the battery 1 and the step-up converter 100 are electrically connected.

Additionally, at this time, the inverter 190 and the inverter 260 perform the switching operation based on the torque command Trq1* of the motor generator 320 and the torque command Trq2* of the motor generator 360 which are received from the vehicle control device (not shown).

Additionally, in the period E4, as the duty command value Db* of the step-up converter 100, a duty ratio which is generated by the duty command generation unit 450 of the step-up converter 100 is output such that the voltage values vcs at both ends of the smoothing capacitor 110 coincide with the output voltage command vcs* of the step-up converter 100. At this time, the duty command value Db* varies with a change of the output voltage command vcs* of the step-up converter 100. At this time, being connected to the battery 1, the voltage values vcin at both ends of the filter capacitor 40 are generally the same as the voltage of the battery 1. Then, the voltage values vcs at both ends of the smoothing capacitor 110 change so as to coincide with the output voltage command vcs of the step-up converter 100 due to the step-up operation according to the duty command value Db* of the step-up converter 100.

At time T4, the control device 530 receives the system start request signal, for example, the ignition off signal, from the external ECU to transit to the processing of Step A50 in the flow chart illustrated in FIG. 3, thereby stopping the switching of the inverter 190 and the inverter 260.

In a period E5, the control device 530 is performing Steps A50 and A60 in the flow chart illustrated in FIG. 3. After stopping the switching of the inverter 190 and the inverter 260 at Step A50, the step transits to Step A60 where the off signal is sent to the system relay 2. At this time, the system start request signal is off. Additionally, at this time, the system relay 2 is off and the battery 1 and the step-up converter 100 are being electrically connected. Additionally, at this time, the inverter 190 and the inverter 260 stop switching, so that the step-up converter, the inverter 190 and the inverter 260 are electrically cut off.

Additionally, in the period E5, the duty command value Db* of the step-up converter 100 maintains the duty ratio output at time T4. At this time, the voltage values vcin at both ends of the filter capacitor 40 similarly maintain the capacitor voltage output at time T4 because the duty command value Db* of the step-up converter 100 maintains the duty ratio output at time T4. At this time, the voltage values vcs at both ends of the smoothing capacitor 110 similarly maintain the capacitor voltage which is output at time T4 because the duty command value Db* of the step-up converter 100 maintains the duty ratio output at time T4.

In such a state, execution of the switching operation of the step-up converter 100 causes electric charges to move between the filter capacitor 40 and the smoothing capacitor 110. When the changes move, the charges pass through the reactor 70, and the switching element 80 of the upper arm and the switching element 90 of the lower arm of the step-up converter, so that the charges are consumed by resistances held by the switching elements and the reactor to realize the discharge operation.

As a result, the step-up converter 100, the inverter 190 and the inverter 260 are electrically cut off to prevent erroneous operation of the motor due to the discharge operation.

At time T5, the system relay 2 receives the off signal to be turned off, so that the step transits to the processing of Step A60 in the flow chart illustrated in FIG. 3.

In a period E6, the control device 530 sequentially executing Steps A60 and A70 in the flow chart illustrated in FIG. 3, in which at Step A60, the discharge control mode is selected by the duty ratio command generation unit 450 of the step-up converter 100 to select and output the duty ratio Ddischg* set in advance. Based on the output duty ratio Ddischg*, the switching operation is performed to consume residual charges of the smoothing capacitor 110. Further, at Step A70, determination is made whether the discharging processing is completed or not. At this time, the system start request signal is off. Additionally, at this time, the system relay 2 is off and the battery 1 and the step-up converter 100 are being electrically cut off. Additionally, at this time, since the inverter 190 and the inverter 260 stop switching, the step-up converter, the inverter 190 and the inverter 260 are electrically cut off. At this time, the duty command value Db* of the step-up converter 100 maintains the duty ratio Ddischg*.

Additionally, in the period E6, the voltage values vcin at both ends of the filter capacitor 40 are decreasing while maintaining a fixed ratio to the voltage values vcs at both ends of the smoothing capacitor 110 because as the duty command value Db* of the step-up converter 100, the duty ratio Ddischg* is output. At this time, the voltage values vcs at both ends of the smoothing capacitor 110 are decreasing while maintaining a fixed ratio to the voltage values vcin at both ends of the filter capacitor 40 because as the duty command value Db* of the step-up converter 100, the duty ratio Ddischg* is output.

At Time T6, the voltage values vcin at both ends of the filter capacitor 40 and the voltage values vcs at both ends of the smoothing capacitor 110 fall below the predetermined values, so that the control device 530 determines that the discharging processing is completed at Step A70 to transit to the processing of Step A80 in the flow chart illustrated in FIG. 3 and after stopping the switching of the step-up converter 100, transit to Step A90.

In a period E7, the control device 530 is in the state of Step A90 in the flow chart illustrated in FIG. 3 and the control device 530 stops. At this time, the system start request signal is off. Additionally, at this time, the system relay 2 is off and the battery 1 and the step-up converter 100 are being electrically cut off. Additionally, at this time, the inverter 190 and the inverter 260 stop switching, so that the step-up converter, the inverter 190 and the inverter 260 are electrically cut off.

Additionally, in the period E7, the step-up converter 100 has the duty command value Db* of 1 to stop switching. The switching element 80 of the upper arm of the step-up converter 100 is set to be on, the switching element 90 of the lower arm is set to be off, and the step-up converter 100, the inverter 190 and the inverter 260 are being electrically connected. At this time, the voltage values vcin at both ends of the filter capacitor 40 are generally 0 or a value not more than the predetermined voltage value set at Step A70 in the flow chart illustrated in FIG. 3 which is used for determining completion of the discharging processing, and residual charges of the filter capacitor 40 are consumed through the discharge resistance 115. At this time, the voltage values vcs at both ends of the smoothing capacitor 110 are generally 0 or a value not more than the predetermined voltage value set at Step A70 in the flow chart illustrated in FIG. 3 which is used for determining completion of the discharging processing, and residual charges of the smoothing capacitor 110 are consumed through the discharge resistance 115.

Figure 5:
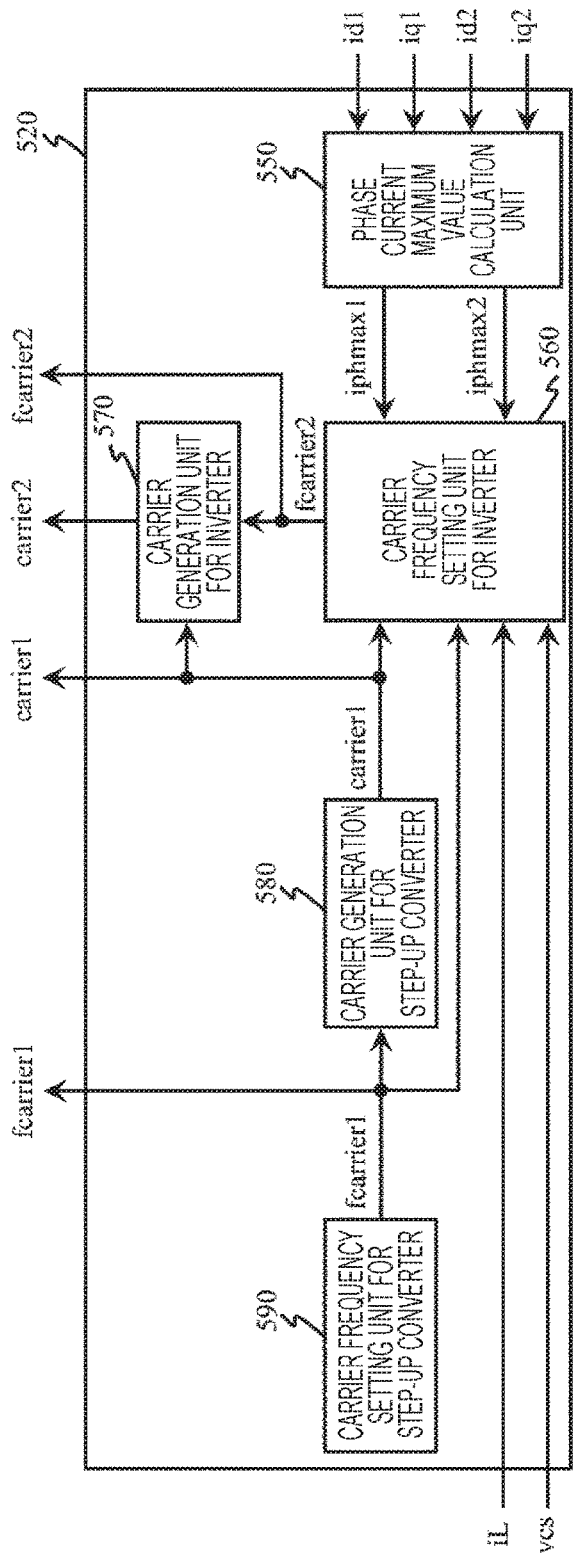
FIG. 5 is a diagram for explaining a configuration of a carrier generation unit 520 according to the first embodiment of the present invention.

FIG. 5 is a diagram for explaining a configuration of the carrier generation unit 520 according to the first embodiment of the present Example.

The carrier generation unit 520 has a carrier frequency setting unit 590 for the step-up converter 100, a carrier generation unit 580 for the step-up converter 100, a phase current maximum value calculation unit 550, a carrier frequency setting unit 560 for the inverters 190 and 260, and a carrier generation unit 570 for the inverters 190 and 260.

The carrier frequency setting unit 590 outputs a value of the carrier frequency fcarrier1 for the step-up converter 100 which is stored in advance. The output value of carrier frequency fcarrier1 for the step-up converter 100 is input to the carrier generation unit 580 and the switching signal generation unit 460 for the step-up converter 100.

The carrier generation unit 580 generates the triangular wave carrier carrier1 based on the carrier frequency fcarrier1 input from the carrier frequency setting unit 590. The generated triangular wave carrier carrier1 is input to the carrier frequency setting unit 560 for the inverters 190 and 260, the carrier generation unit 570 and the switching signal generation unit 460 for the inverters 190 and 260, and the duty command generation unit 450 for the step-up converter 100.

The phase current maximum value calculation unit 550 calculates a phase current maximum value iphmax1 of the motor generator 320 by using the dq-axis current values id1, iq1 of the motor generator 320. Further, using the dq-axis current values id2, iq2 of the motor generator 360, a phase current maximum value iphmax2 of the motor generator 360 is calculated.

The carrier frequency setting unit 560 sets the carrier frequency fcarrier2 for the inverters 190 and 260 based on the current value it flowing through the reactor 70, the voltage values vcs at both ends of the smoothing capacitor 110, the carrier frequency fcarrier1 for the step-up converter 100 set by the carrier frequency setting unit 590 for the step-up converter 100, the triangular wave carrier carrier1 for the step-up converter 100 which is generated by the carrier generation unit 580 for the step-up converter 100, the phase current maximum value iphmax1 of the motor generator 320 which is calculated by the phase current maximum value calculation unit 550, and the phase current maximum value iphmax2 of the motor generator 360.

The carrier generation unit 570 generates the triangular wave carrier carrier2 for the inverters 190 and 260 based on the carrier frequency fcarrier2 for the inverters 190 and 260 which is set by the carrier frequency setting unit 560 for the inverters 190 and 260, and the triangular wave carrier carrier1 for the step-up converter 100 which is generated by the carrier generation unit 580 for the step-up converter 100.

Figure 6:
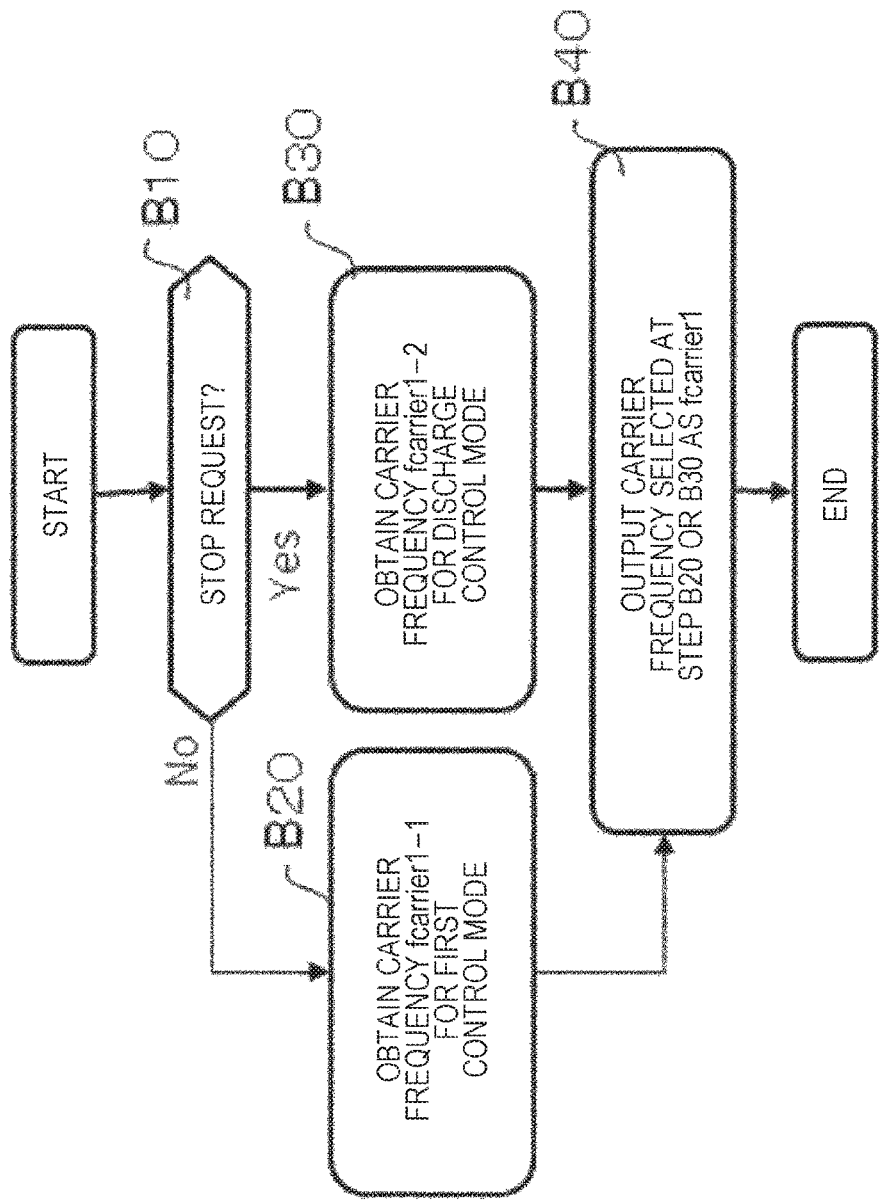
FIG. 6 is a diagram for explaining a processing procedure of a carrier frequency setting unit 590 of a step-up converter 100 according to the first embodiment of the present invention.

FIG. 6 is a diagram for explaining a processing procedure of the carrier frequency setting unit 590 for the step-up converter 100 according to the first embodiment of the present invention.

At Step B10, determination is made whether a stop request received from the system or not. When confirming the stop request to the control device 530 such as the ignition off signal of the external ECU, the step transits to Step B30. When there is no stop request to the control device 530, the step transits to Step B20.

At Step B20, an already stored first control mode carrier frequency fcarrier1-1 is obtained to transit to B40.

A Step B30, an already stored discharge control mode carrier frequency fcarrier1-2 is obtained to transit to B40.

At Step B40, the carrier frequency selected at Step B20 or B30 is output as the fcarrier1, and the output fcarrier1 is input to the carrier generation unit for the step-up converter 100. At this time, the discharge control mode carrier frequency fcarrier1-2 desirably has a smaller value than that of the first control mode carrier frequency fcarrier1-1. This enables control with a fixed duty and enables a carrier frequency at the time of discharge control to be set lower than that of normal operation, thereby further increasing a discharge speed.

Figure 7:
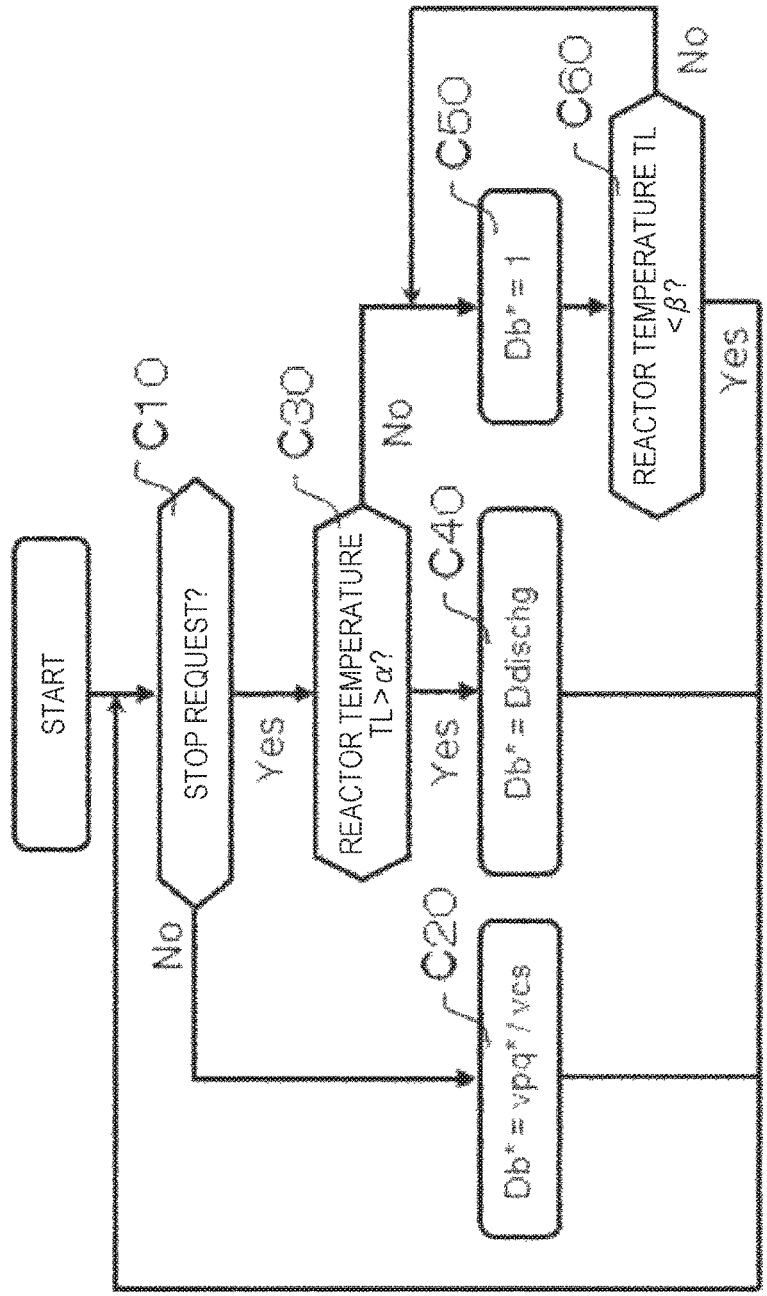
FIG. 7 is a diagram for explaining a processing procedure of a duty command generation unit 450 of the step-up converter 100 according to the first embodiment of the present invention.

FIG. 7 is a diagram for explaining a processing procedure of the duty command generation unit 450 for the step-up converter 100 according to the first embodiment of the present invention.

At Step C10, determination is made whether a stop request received from the system or not. When confirming the stop request to the control device 530 such as the ignition off signal of the external ECU, the step transits to Step C30 to execute the operation in the discharge operation mode. When there is no stop request to the control device 530, the step transits to Step C20 to perform operation in the first control mode.

At Step C20, operation in the first control mode is performed. The obtained P-Q voltage command value vpq* of the step-up converter 100 and the voltage values vcs at both ends of the smoothing capacitor 110 are substituted into the following formula to calculate the duty command value Db* of the step-up converter 100 and then the step again transits to Step C10.

At Step C30, determination is made whether a thermistor temperature TL of the reactor obtained by a thermistor 71 exceeds a predetermined value $\alpha$ stored in advance or not. When the thermistor temperature TL exceeds the predetermined value $\alpha$, the step transits to Step C40 and when the same falls below the predetermined value $\alpha$, the step transits to Step C50.

At Step C40, after outputting the fixed duty ratio Ddischg in the discharge operation mode which is stored in advance as the duty command value Db* of the step-up converter 100, the step again transits to Step C10.

At Step C50, after outputting a fixed duty ratio 1 as the duty command value Db* of the step-up converter 100, the step transits to Step C60.

At Step C60, determination is made whether the thermistor temperature TL of the reactor obtained by the thermistor 71 exceeds the predetermined value $\beta$ stored in advance or not. When the thermistor temperature TL exceeds the predetermined value $\beta$, the step transits to Step C50 and when the same falls below the predetermined value $\beta$, the step transits to Step C10.

This enables discharge operation prohibiting processing to be performed at Step C50 when the thermistor temperature TL exceeds the predetermined value $\alpha$ even during the execution of the discharge operation mode at Step C40, thereby preventing the reactor temperature from further increasing to protect the reactor.

Here, the predetermined value $\alpha$ is preferably selected within a range of an upper limit temperature at which the reactor is operable according to temperature characteristic.

Additionally, although at Step C50, as a switching operation stop means in the discharge control mode, the duty command value 1 is applied, and the switching element 80 of the upper arm of the step-up converter 100 is set to be on and the switching element 90 of the lower arm is set to be off, the switching elements 80 and 90 may be simultaneously set to be off to serve as a switching operation stop means.

Additionally, at Step C50, even when the discharge operation prohibiting processing is in execution, if the thermistor temperature TL falls below the predetermined value $\beta$, the processing in the discharge operation mode at Step C40 is again executed, so that the discharge operation can be completed while protecting the reactor.

Here, the predetermined value $\beta$ is desirably set to be a smaller value than the predetermined value $\alpha$.

Additionally, even when determination is made whether or not a stop request is received from the system at Step C10 while the coil temperature of the reactor is increased due to operation in the first control mode at Step C20, if the thermistor temperature TL exceeds the predetermined value $\alpha$ at Step C30, the discharge operation prohibiting processing at Step C50 is executed to prevent the reactor temperature from further increasing to protect the reactor.

Figure 8:
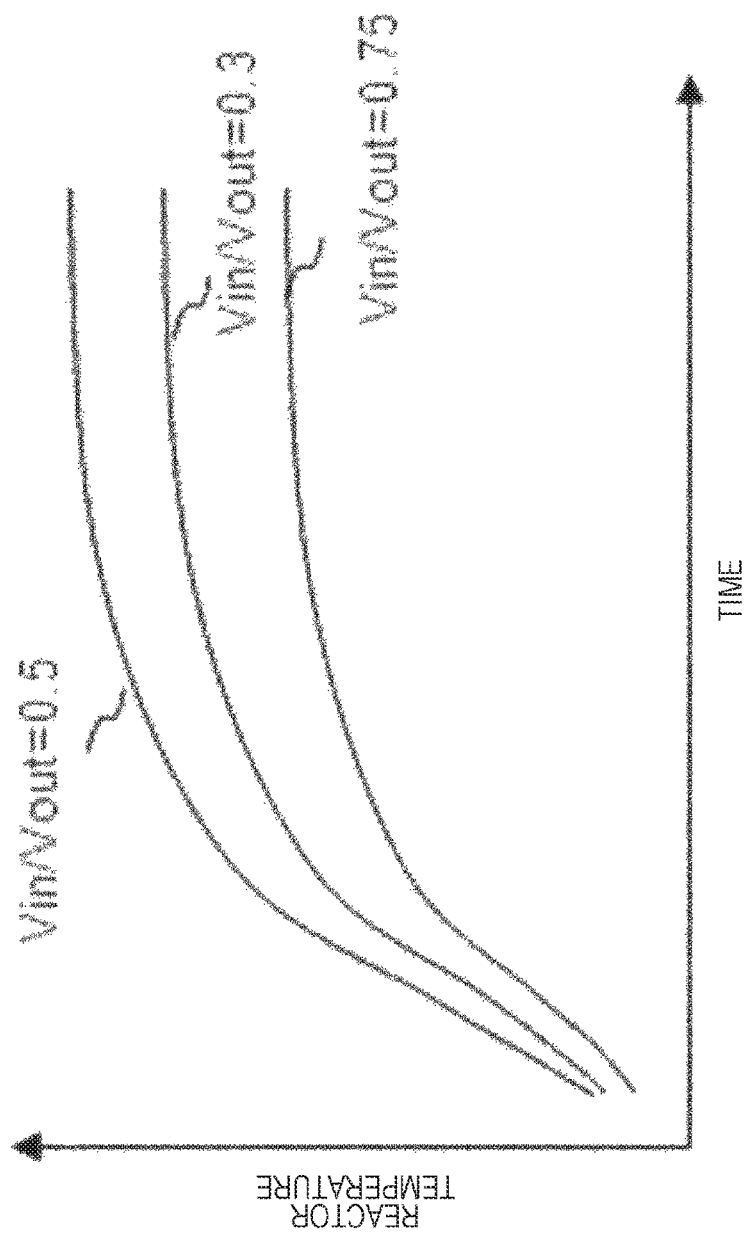
FIG. 8 illustrates temperature characteristic of a coil and a core of a reactor when the step-up converter is driven.

FIG. 8 illustrates temperature characteristic of a coil and a core of the reactor 70 when the step-up converter is driven.

Illustrated is a time change of the reactor coil and core temperatures when duty control is performed according a ratio of the input voltage Vin to the output voltage Vout of the step-up converter 100. According to FIG. 3, as a reactor temperature change, a temperature rise the largest when Vin/Vout=0.5, that is, when the output voltage is double the input, voltage.

A large temperature increase means that a damage due to flowing of a current through the reactor 70 is large, and when Vin/Vout=0.5, the reactor damage will be the largest. The reason will be described as follows.

Formula (1) shows an alternating current copper loss. The alternating current copper loss is proportional to the square of an effective value of a reactor current ripple. Therefore, the lower a carrier frequency is, the larger the alternating current copper loss becomes, thereby increasing the coil temperature.

$$P_{coil\_ac} = I_{LRipple}^2 R_{ac} \quad \text{Formula (1)}$$

Pcoil_ac [W]: alternating current copper loss,
ILRipple [Arms]: reactor current ripple (effective value),
Rac [Ω]: alternating current resistance.
Formula (2) shows a reactor current ripple.

$$I_{LRipple} = \frac{V_L}{L} \cdot \text{Time} = \frac{V_L}{L} \cdot \text{Duty} \cdot \frac{1}{f_c} = \frac{V_L}{L} \cdot \left(1 - \frac{V_{in}}{V_{out}}\right) \cdot \frac{1}{f_c} \quad \text{Formula (2)}$$

ILRipple [Ap-p]: reactor current ripple (peak-to-peak value),
Vt [V]: voltage applied to reactor,
L [H]: inductance of reactor,
Time [s]: voltage application time,
fc [Hz]: carrier frequency,
Vin [V]: input voltage,
Vout [V]: output voltage.

Here, assuming that when the switch of the lower arm of the step-up converter is on, Vt equals Vin, Formula (2) will be the same as Formula (3).

$$I_{LRipple} = \frac{V_{in}}{L} \cdot \left(1 - \frac{V_{in}}{V_{out}}\right) \cdot \frac{1}{f_c} \quad \text{Formula (3)}$$

The ILRipple takes the maximum value when Formula (4) results in 0, that is, when Formula (5) establishes.

$$\frac{dI_{LRipple}}{dV_{in}} = \frac{V_{in}}{L} \cdot \left(1 - \frac{V_{in}}{V_{out}}\right) \cdot \frac{1}{f_c} = 0 \quad \text{Formula (4)}$$

$$V_{in} = \frac{1}{2} V_{out} \quad \text{Formula (5)}$$

From Formula (5), when an output voltage is twice as much as the input voltage, the reactor current ripple becomes the largest. Since from Formula (1), an alternating current copper loss of the coil is proportional to an effective value of the reactor current ripple, when the output voltage is double the input voltage, the alternating current copper loss becomes larger than that in other voltage conditions, so that the coil temperature is increased. Also with respect to the core temperature, the core loss becomes the largest with Vin/Vout=0.5 when the reactor current ripple is the largest, so that the core temperature becomes higher than with other input voltage.

With this arrangement, switching the control mode so as to select a predetermined duty ratio such that a loss becomes the largest during the discharge operation enables speed-up of capacitor discharging in the discharge operation of the step-up converter 100.

REFERENCE SIGNS LIST 1 battery
10 chassis ground
20 capacitor
30 Y capacitor
40 filter capacitor
110 smoothing capacitor
70 reactor
50 voltage sensor
120 voltage sensor
60 current sensor
270 current sensor
280 current sensor
310 angle detector
350 angle detector
100 step-up converter
80 switching element of upper arm of step-up converter 100
90 switching element of lower arm of step-up converter 100
440 P-Q voltage command generation unit of step-up converter 100
450 duty command generation unit of step-up converter 100
580 carrier generation unit for step-up converter 100
590 carrier frequency setting unit for step-up converter 100
620 duty command calculation unit of step-up converter 100
620 duty command updating unit of step-up converter 100
650 comparison unit for step-up converter 100
670 switching prohibiting processing unit for step-up converter 100
190 inverter
260 inverter
130 U-phase switching element of upper arm of inverter 190
140 U-phase switching element of lower arm of inverter 190
150 V-phase switching element of upper arm of inverter 190
160 V-phase switching element of lower arm of inverter 190
170 W-phase switching element of upper arm of inverter 190
180 U-phase switching element of lower arm of inverter 190
200 U-phase switching element of upper arm of inverter 260
210 U-phase switching element of lower arm inverter 260
220 V-phase switching element of upper arm of inverter 260
230 V-phase switching element of lower arm of inverter 260
240 W-phase switching element of upper arm of inverter 260
250 U-phase switching element of lower arm of inverter 260
470 UVW phase duty command generation unit for inverters 190 and 260
480 UVW phase voltage command generation unit for inverters 190 and 260
560 carrier frequency setting unit for inverters 190 and 260
570 carrier generation unit for inverters 190 and 260
600 UVW phase duty command calculation unit for inverters 190 and 260
610 UVW phase duty command updating unit for inverters 190 and 260
640 comparison unit for inverters 190 and 260
660 switching prohibiting processing unit for inverters 190 and 260
290 three-Phase coil wound around stator of motor generator 320
330 three-phase coil wound around a stator of the motor generator 360
300 rotor of motor generator 320
340 rotor of motor generator 360
320 motor generator 360 motor generator
370 motor generator shaft of motor generator 320
375 motor generator shaft of motor generator 360
460 switching signal generation unit
500 dc-axis current command generation unit
520 carrier generation unit
490 UVW phase/dg-axis conversion unit
510 rotation speed calculation unit
530 control device
540 gate drive circuit
550 phase current maximum value calculation unit
430 drive shaft of vehicle
385 engine
390 crank shaft
400 propeller shaft
420 drive shaft
380 transmission
410 differential gear
iL current value flowing through reactor 70
θ1 magnetic pole position of rotor 300 of motor generator 320
θ2 magnetic pole position of rotor 340 of motor generator 360
ω1 rotation speed of rotor 300 of motor generator 320
ω2 rotation speed of rotor 340 of motor generator 360
vcs voltage values at both ends of smoothing capacitor 110
Db* duty command value of step-up converter 100
Sbp switching signal of upper arm of step-up converter 100
Sbn switching signal of lower arm of step-up converter 100
id1 d-axis current value of motor generator 320
iq1 c-axis current value of motor generator 320
id2 d-axis current value of motor generator 360
iq2 q-axis current value of motor generator 360
vcin voltage values at both ends of filter capacitor 40
Sup1 U-phase switching signal of upper arm of inverter 190
Sun1 U-phase switching signal of lower arm of inverter 190
Svp1 V-phase switching signal of upper arm of inverter 190
Svn1 V-phase switching signal of lower arm of inverter 190
Swp1 U-phase switching signal of upper arm of inverter 190
Swn1 W-phase switching signal of lower arm of inverter 190
Sup2 U-phase switching signal of upper arm of inverter 260
Sun2 U-phase switching signal of lower arm of inverter 260
Svp2 V-phase switching signal of upper arm of inverter 260
Svn2 V-chase switching signal of lower arm of inverter 260
Swp2 W-phase switching signal of upper arm of inverter 260
Swn2 W-phase switching signal of lower arm of inverter 260
iud1 current value flowing through U-phase coil of motor generator 320
ivd1 current value flowing through V-phase coil of motor generator 320
iwd1 current value flowing through U-phase coil of motor generator 320
iud2 current value flowing through U-phase coil of motor generator 360
ivd2 current value flowing through V-phase coil of motor generator 360
iwd2 current value flowing through W-phase coil of motor generator 360
id1* d-axis current command value of motor generator 320
ig1* g-axis current command value of motor generator 320
id2* d-axis current command value of motor generator 360
ig2* g-axis current command value of motor generator 360
vcs* output voltage command of step-up converter 100
vpa* P-Q voltage command value
vu1* U-phase voltage command value of inverter 190
vv1* v-phase voltage command value or inverter 190
vw1* W-phase voltage command value of inverter 190
vu2* U-phase voltage command value of inverter 260
vv2* V-phase voltage command value of inverter 260
vw2* U-phase voltage command value of inverter 260
Du1* U-phase duty command value of inverter 190
Dv1* V-chase duty command value of inverter 190
Dw1* U-phase duty command value of inverter 190
Du2* U-phase duty command value of inverter 260
Dv2* V-phase duty command value of inverter 260
Dw2* W-phase duty command value of inverter 260
carrier1 triangular wave carrier for step-up converter 100
carrier2 triangular wave carrier for inverters 190 and 260
fcarrier1 carrier frequency for step-up converter 100
fcarrier2 carrier frequency for inverters 190 and 260
Tcarrier1 cycle of triangular wave carrier carrier1
Tcarrier2 cycle of triangular wave carrier carrier2

The invention claimed is:

1. A power conversion device comprising:
an inverter circuit unit which converts a direct current into an alternating current;
a step-up circuit unit which steps up a voltage to be applied to the inverter circuit unit;
a smoothing capacitor connected electrically in parallel to the inverter circuit unit and the step-up circuit unit;
a step-up circuit control unit which controls the step-up circuit unit; and
a temperature detection circuit unit which detects a coil temperature of the reactor, wherein
the step-up circuit unit has a first switching element, a second switching element connected electrically in series to the first switching element, and a reactor having a conducting current controlled by switching operation of the first switching element and the second switching element,
the step-up circuit control unit has a first control mode of controlling the switching operation of the first switching element and the second switching element by changing a duty command value and outputting a stepped up voltage from the step-up circuit unit, and a discharge control mode of discharging electric charges stored in the smoothing capacitor into the reactor, with the duty command value fixed to a predetermined value,
when the coil temperature of the reactor detected by the temperature detection circuit unit exceeds a first predetermined value, the step-up circuit control unit inhibits discharge operation of stopping switching operation in the discharge control mode, and
when the coil temperature of the reactor detected by the temperature detection circuit unit is less than a second predetermined value that is lower than the first predetermined value, the discharge control mode is executed even when the step-up circuit control unit inhibits discharge operation of stopping switching operation in the discharge control mode, such that discharging is completed while protecting the reactor.

2. The power conversion device according to claim 1, wherein in the discharge control mode, a fixed duty is output which makes a ratio of an input voltage to an output voltage of the step-up circuit unit be generally ½.

3. The power conversion device according to claim 1, comprising:
a power supply device which supplies a direct-current voltage to the step-up circuit unit; and
a second smoothing capacitor connected electrically in parallel to the step-up circuit unit and the power supply device, wherein in the discharge control mode, with the duty command value fixed to the predetermined value, electric charges stored in the smoothing capacitor and the second smoothing capacitor are discharged into the reactor.

4. The power conversion device according to claim 1, wherein the first control mode of the step-up circuit control unit is controlled at a first carrier frequency for controlling the first switching element and the second switching element, and the discharge control mode of the step-up circuit control unit is controlled at a second carrier frequency for controlling the first switching element and the second switching element, with the first carrier frequency being lower than the second carrier frequency.

5. The power conversion device according to claim 1, wherein when the discharge operation in the discharge control mode is inhibited, if the coil temperature of the reactor detected by the temperature detection circuit unit falls below the first predetermined value, the step-up circuit control unit again allows the switching operation in the discharge control mode.

6. The power conversion device according to claim 1, wherein during the first control mode operation, when selecting the discharge control mode, with the coil temperature of the reactor detected by the temperature detection circuit unit exceeding the first predetermined value, the step-up circuit control unit inhibits the switching operation during a predetermined time period.

\* \* \* \* \*